United States Patent
Fattal et al.

(10) Patent No.: US 12,072,577 B2
(45) Date of Patent: Aug. 27, 2024

(54) HORIZONTAL PARALLAX MULTIVIEW BACKLIGHT, DISPLAY, AND METHOD

(71) Applicant: LEIA INC., Menlo Park, CA (US)

(72) Inventors: David A. Fattal, Menlo Park, CA (US); Thomas Hoekman, Redwood City, CA (US); Ming Ma, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 18/142,901

(22) Filed: May 3, 2023

(65) Prior Publication Data

US 2023/0276042 A1    Aug. 31, 2023

Related U.S. Application Data (63) Continuation of application No. PCT/US2021/056899, filed on Oct. 27, 2021.
(Continued)

(51) Int. Cl.
*G02F 1/13357* (2006.01)
*F21V 8/00* (2006.01)
(Continued)

(52) U.S. Cl.
CPC ..... *G02F 1/133606* (2013.01); *G02B 6/0073* (2013.01); *G02B 30/33* (2020.01);
(Continued)

(58) Field of Classification Search
CPC .... G02B 30/33; G09G 3/3208; G09G 3/3426; G09G 2320/028; H04N 13/349; H04N 13/351
See application file for complete search history.

(56) References Cited

U.S. PATENT DOCUMENTS

| 5,304,288 A | 4/1994 | De et al. |
| 6,304,288 B1 | 10/2001 | Hamagishi |

(Continued)

FOREIGN PATENT DOCUMENTS

| CN | 103616767 | 3/2014 |
| JP | 2008096765 A | 4/2008 |

(Continued)

OTHER PUBLICATIONS

International Search Report and Written Opinion (ISRWO) by International Searching Authority (ISA) Korean Intellectual Property Office (KIPO) dated Feb. 21, 2022 (11 pages) for foreign counterpart parent International Application No. PCT/US2021/056899.

(Continued)

*Primary Examiner* — Keith G. Delahoussaye
(74) *Attorney, Agent, or Firm* — Schwegman Lundberg & Woessner, P.A.

(57) ABSTRACT

A multiview backlight, multiview display, and method employ arrays of active emitters arranged in columns to provide directional light beams having directions corresponding to view directions of a multiview display. The multiview backlight includes a first array of active emitters arranged in columns and configured to provide a first plurality of directional light beams and a second array of active emitters arranged in columns and configured to provide a second plurality of directional light beams. Columns of the second active emitter array are disposed between and alternate with the columns of the first active emitter array. The multiview display further includes an array of light valves configured to modulate the directional light beams to display a multiview image. The view directions of the multiview display are in a plane that crosses the columns of first and second active emitter arrays.

12 Claims, 6 Drawing Sheets

Related U.S. Application Data (60) Provisional application No. 63/111,209, filed on Nov. 9, 2020.

(51) Int. Cl.
    *G02B 30/33*     (2020.01)
    *G09G 3/3208*     (2016.01)
    *G09G 3/34*     (2006.01)
    *H04N 13/32*     (2018.01)
    *H04N 13/349*     (2018.01)
    *H04N 13/351*     (2018.01)

(52) U.S. Cl.
    CPC ......... *G09G 3/3208* (2013.01); *G09G 3/3426* (2013.01); *H04N 13/32* (2018.05); *H04N 13/349* (2018.05); *H04N 13/351* (2018.05); *G09G 2320/028* (2013.01)

(56) References Cited

U.S. PATENT DOCUMENTS

| | | | |
|---|---|---|---|
| 7,580,186 B2 | 8/2009 | Mather et al. | |
| 9,128,226 B2 | 9/2015 | Fattal et al. | |
| 9,201,270 B2 | 12/2015 | Fattal et al. | |
| 9,279,989 B2 | 3/2016 | Song et al. | |
| 9,298,168 B2 | 3/2016 | Taff et al. | |
| 9,372,349 B2 | 6/2016 | Brug et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,551,546 B2 | 2/2020 | Fattal | |
| 10,649,128 B2 | 5/2020 | Fattal et al. | |
| 10,705,281 B2 | 7/2020 | Fattal et al. | |
| 10,798,371 B2 | 10/2020 | Fattal | |
| 10,802,212 B2 | 10/2020 | Fattal | |
| 10,802,443 B2 | 10/2020 | Fattal | |
| 10,810,917 B2 | 10/2020 | Fattal | |
| 10,830,939 B2 | 11/2020 | Fattal et al. | |
| 10,838,134 B2 | 11/2020 | Fattal et al. | |
| 10,884,175 B2 | 1/2021 | Fattal | |
| 10,928,564 B2 | 2/2021 | Fattal | |
| 10,928,677 B2 | 2/2021 | Aieta et al. | |
| 10,969,627 B2 | 4/2021 | Fattal et al. | |
| 11,004,407 B2 | 5/2021 | Fattal et al. | |
| 11,011,121 B2 | 5/2021 | Fattal et al. | |
| 11,016,235 B2 | 5/2021 | Fattal et al. | |
| 11,041,988 B2 | 6/2021 | Fattal et al. | |
| 11,048,036 B2 | 6/2021 | Ma et al. | |
| 11,143,810 B2 | 10/2021 | Fattal et al. | |
| 11,143,811 B2 | 10/2021 | Fattal et al. | |
| 11,169,391 B2 | 11/2021 | Fattal et al. | |
| 11,200,855 B2 | 12/2021 | Fattal | |
| 11,307,344 B2 | 4/2022 | Fattal et al. | |
| 11,327,337 B2 | 5/2022 | Fattal | |
| 11,418,775 B2 | 8/2022 | Fattal | |
| 2005/0046951 A1 | 3/2005 | Sugihara et al. | |
| 2007/0013624 A1 | 1/2007 | Bourhill | |
| 2008/0252955 A1 | 10/2008 | Redert | |
| 2008/0285282 A1 | 11/2008 | Karman et al. | |
| 2009/0322986 A1 | 12/2009 | Wei et al. | |
| 2010/0118218 A1 | 5/2010 | Eichenlaub | |
| 2011/0157167 A1 | 6/2011 | Bennett et al. | |
| 2012/0200807 A1 | 8/2012 | Wei et al. | |
| 2012/0235891 A1 | 9/2012 | Nishitani et al. | |
| 2012/0249537 A1 | 10/2012 | Bae et al. | |
| 2013/0169518 A1 | 7/2013 | Wu et al. | |
| 2014/0085570 A1 | 3/2014 | Kuwata et al. | |
| 2014/0160724 A1 | 6/2014 | Lerman | |
| 2015/0268479 A1 | 9/2015 | Woodgate et al. | |
| 2016/0048060 A1 | 2/2016 | Chen et al. | |
| 2016/0349524 A1 | 12/2016 | Pijlman et al. | |
| 2016/0379394 A1 | 12/2016 | Kim et al. | |
| 2017/0329149 A1* | 11/2017 | Fattal ..................... G02B 30/27 | |
| 2017/0363794 A1 | 12/2017 | Wan et al. | |
| 2018/0011237 A1* | 1/2018 | Fattal ..................... G02B 5/18 | |
| 2018/0156963 A1* | 6/2018 | Fattal ............... G02F 1/133606 | |
| 2019/0017687 A1 | 1/2019 | Zhang | |
| 2019/0018186 A1 | 1/2019 | Fattal | |
| 2020/0018886 A1* | 1/2020 | Fattal ................. G02B 6/0068 | |
| 2020/0051513 A1* | 2/2020 | Fattal ................... H04N 13/359 | |
| 2020/0057343 A1 | 2/2020 | Epstein et al. | |
| 2020/0059639 A1 | 2/2020 | Fattal et al. | |
| 2020/0158937 A1* | 5/2020 | Chang ................. G02B 6/0088 | |
| 2020/0209609 A1 | 7/2020 | Clarke et al. | |
| 2020/0228782 A1 | 7/2020 | Fattal | |
| 2020/0310135 A1 | 10/2020 | Fattal | |
| 2020/0409172 A1 | 12/2020 | Fattal | |
| 2021/0157050 A1 | 5/2021 | Fattal | |
| 2021/0209980 A1* | 7/2021 | Fattal ..................... G09G 3/02 | |
| 2021/0255476 A1 | 8/2021 | Fattal | |
| 2021/0311244 A1 | 10/2021 | Fattal et al. | |
| 2021/0390914 A1 | 12/2021 | Fattal | |
| 2021/0407438 A1 | 12/2021 | Fattal | |
| 2022/0044644 A1 | 2/2022 | Fattal | |
| 2022/0236596 A1 | 7/2022 | Fattal | |
| 2023/0276043 A1 | 8/2023 | Fattal et al. | |

FOREIGN PATENT DOCUMENTS

| | | | | |
|---|---|---|---|---|
| JP | 2010044181 | | 2/2010 | |
| JP | 2104112147 A | | 6/2014 | |
| JP | 2016100342 A | | 5/2016 | |
| JP | 2018503230 A | | 2/2018 | |
| JP | 2020521184 | | 7/2020 | |
| JP | 2020521185 A | | 7/2020 | |
| JP | 2022520582 | | 3/2022 | |
| JP | 2023549749 | | 11/2023 | |
| WO | 2012038856 A1 | | 3/2012 | |
| WO | WO-2018213100 A1 * | | 11/2018 | ............. G02B 30/33 |
| WO | 2020167374 | | 8/2020 | |
| WO | WO-2020185264 A1 | | 9/2020 | |
| WO | WO-2020219400 A1 | | 10/2020 | |
| WO | 2022098550 A1 | | 5/2022 | |
| WO | WO-2022098549 A1 | | 5/2022 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances In Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"U.S. Appl. No. 18/143,466, Notice of Allowance mailed Feb. 1, 2024", 12 pgs.

"International Application Serial No. PCT/US2021/056899, International Preliminary Report on Patentability mailed May 19, 2023", 7 pgs.

"International Application Serial No. PCT/US2021/056901, International Preliminary Report on Patentability mailed May 19, 2023", 8 pgs.

(56) References Cited

OTHER PUBLICATIONS

"International Application Serial No. PCT/US2021/056901, International Search Report mailed Feb. 21, 2022", 4 pgs.
"International Application Serial No. PCT/US2021/056901, Written Opinion mailed Feb. 21, 2022", 6 pgs.
"Japanese Application Serial No. 2023-527445, Notification of Reasons for Refusal mailed Apr. 9, 2024", w English translation, 18 pgs.
"Japanese Application Serial No. 2023-527445, Search Report mailed Mar. 21, 2024", w English translation, 45 pgs.
"Japanese Application Serial No. 2023-527456, Notification of Reasons for Refusal mailed Jun. 4, 2024", w/ English translation, 10 pgs.

\* cited by examiner

HORIZONTAL PARALLAX MULTIVIEW BACKLIGHT, DISPLAY, AND METHOD

CROSS-REFERENCE TO RELATED APPLICATIONS

This application is a continuation application of and claims priority to International Patent Application No. PCT/US2021/056899, filed Oct. 27, 2021, which claims the benefit of priority to U.S. Provisional Patent Application Ser. No. 63/111,209, filed Nov. 9, 2020, the entirety of each of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview backlight and a multiview display that employ arrays of active emitters that may be reconfigured during operation. In particular, embodiments consistent with the principles described herein provide a multiview backlight employing arrays of active emitters arranged as spaced-apart columns configured to provide directional light beams having a plurality of different principal angular directions in a plane that crosses the spaced-apart columns. According to various embodiments, columns of a second array of active emitter are disposed between and alternate with columns of a first array of active emitters. Further, selective activation of the first and second active emitter arrays may facilitate reconfiguration of view directions of the multiview backlight as well as a number of views the multiview display, according to various embodiments. According to some embodiments, the columns of active emitters of the active emitter arrays one or both of may be spaced apart from one another in a manner corresponding to a spacing of multiview pixels of the multiview display and may have a width that is comparable to a size of a light valve of the multiview display in the plane that crosses the columns. The different principal angular directions of the light beams provided by active emitters of the first and second active emitter arrays correspond to directions of various different views of the multiview display or equivalently of a multiview image displayed by the multiview display, according to various embodiments. Reconfiguration during operation may facilitate varying one or both of a resolution and a number of views provided in the plane that crosses the columns (e.g., a horizontal plane).

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast and herein, a 'multiview display' is defined as an electronic display or display system configured to provide different views of a multiview image in or from different view directions. In particular, the different views may represent different perspective views of a scene or object of the multiview image. Uses of multiview backlighting and multiview displays applicable to the display of multiview images described herein include, but are not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices.

Figure 1A:
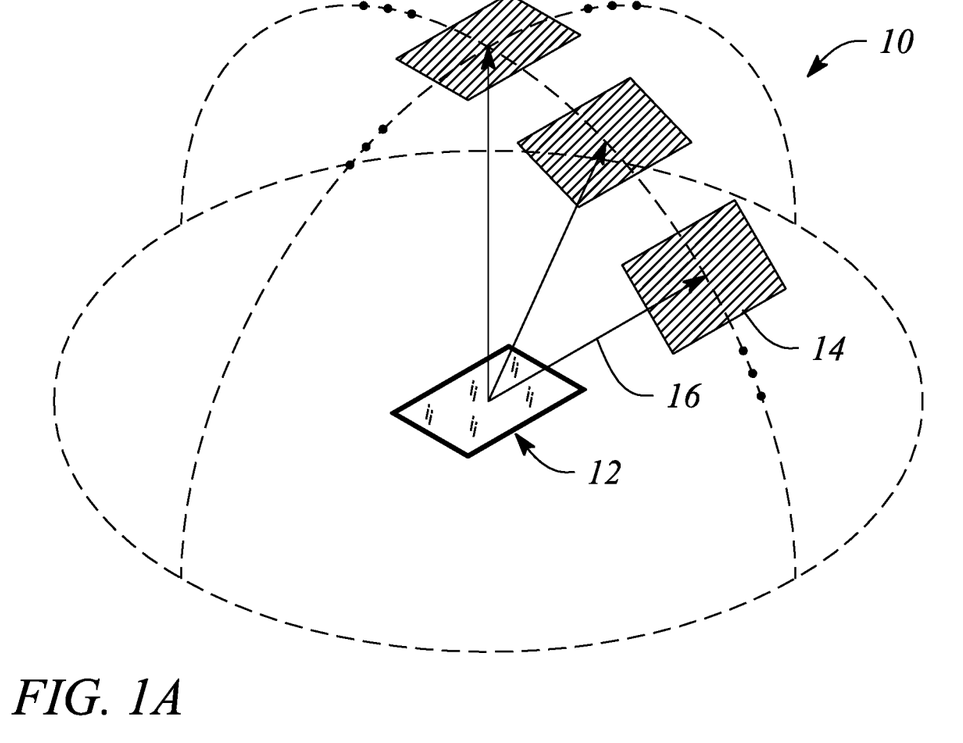
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 configured to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 of FIG. 1A provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. Further, the illustrated multiview display 10 represents a so-called horizontal-parallax-only (HPO) display in that different the views 14 are in a single plane, e.g., the horizontal plane. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta,\phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam.

Figure 1B:
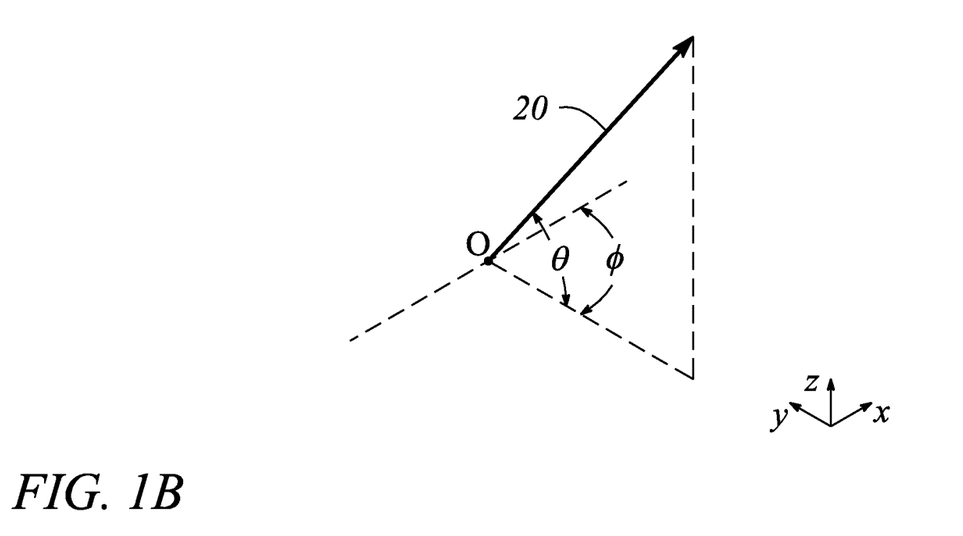
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta,\phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

The term 'multiview' as used in the terms 'multiview image' and 'multiview display' is defined herein as a plurality of views representing different perspectives or including angular disparity between views of the view plurality. In addition, herein the term 'multiview' explicitly includes two or more different views (e.g., a minimum of three views and generally more than three views), by definition herein. In some embodiments, 'multiview display' as employed herein may be used to explicitly distinguish from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing pixels of views in each of a similar plurality of different views of a multiview display. In particular, a multiview pixel may have an individual view pixel corresponding to or representing a particular view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels corresponding to pixels located at $\{x_1,y_1\}$ in each of the different views of a multiview image, while a second multiview pixel may have individual view pixels corresponding to pixels located at $\{x_2,y_2\}$ in each of the different views, and so on. View pixels, in turn, are equivalent to light valves of an array of light valves of the multiview display, by definition herein. As such, the terms 'view pixel' and 'light valve' may be used interchangeably herein unless a distinction is necessary for proper understanding.

Herein, an 'active emitter' is defined as an active source of light (e.g., an optical emitter configured to produce and emit light when activated). As such, an active emitter does not receive light from another source of light, by definition. Instead, the active emitter directly generates light when activated. The active emitter may be activated by applying a power source such as a voltage or a current, by definition herein. For example, the active emitter may comprise an optical emitter such as a light emitting diode (LED) that emits light when activated or turned on. The LED may be activated by applying a voltage to terminals of the LED, for example. In particular, herein the active emitter may be substantially any active source of light or comprise substantially any active optical emitter including, but not limited to, one or more of a light emitting diode (LED), a laser, an organic light emitting diode (OLED), a polymer light emitting diode, a plasma-based optical emitter, a miniLED (mLED), and a microLED (μLED). The light produced by the active emitter may have a color (i.e., may include a particular wavelength of light), or may be a plurality or range of wavelengths (e.g., polychromatic light or white light). Different colors of light provided or produced by an active emitter may include, but are not limited to, primary colors (e.g., red, green, blue), for example. By definition herein, a 'color emitter' is an active emitter that provides light having a color. In some embodiments, the active emitter may comprise a plurality of active emitters. For example, the active emitter may include a set or group of active emitters. In some embodiments, at least one of the active emitters in the set or group of active emitters may generate light having a color, or equivalently a wavelength, that differs from a color or wavelength of light produced by at least one other optical emitter of the plurality.

Further by definition herein, the term 'broad-angle' as in 'broad-angle emitted light' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (120°). Alternatively, the broad-angle emitted light may have an angular range that is greater than plus and minus forty-five degrees (e.g., >±45°) relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°). A 'broad-angle backlight' is a backlight configured to provide broad-angle emitted light, by definition herein.

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an active emitter' means one or more active emitters and as such, 'the active emitter' means 'the active emitter(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
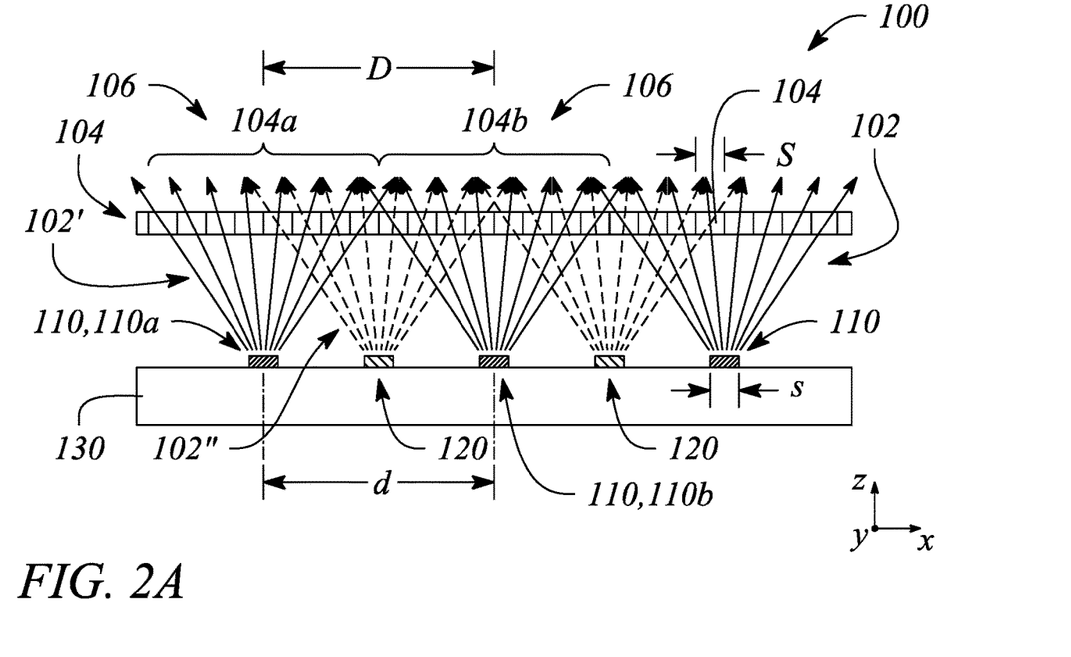
FIG. 2A illustrates a cross-sectional view of a multiview backlight in an example, according to an embodiment consistent with the principles described herein.
Figure 2B:
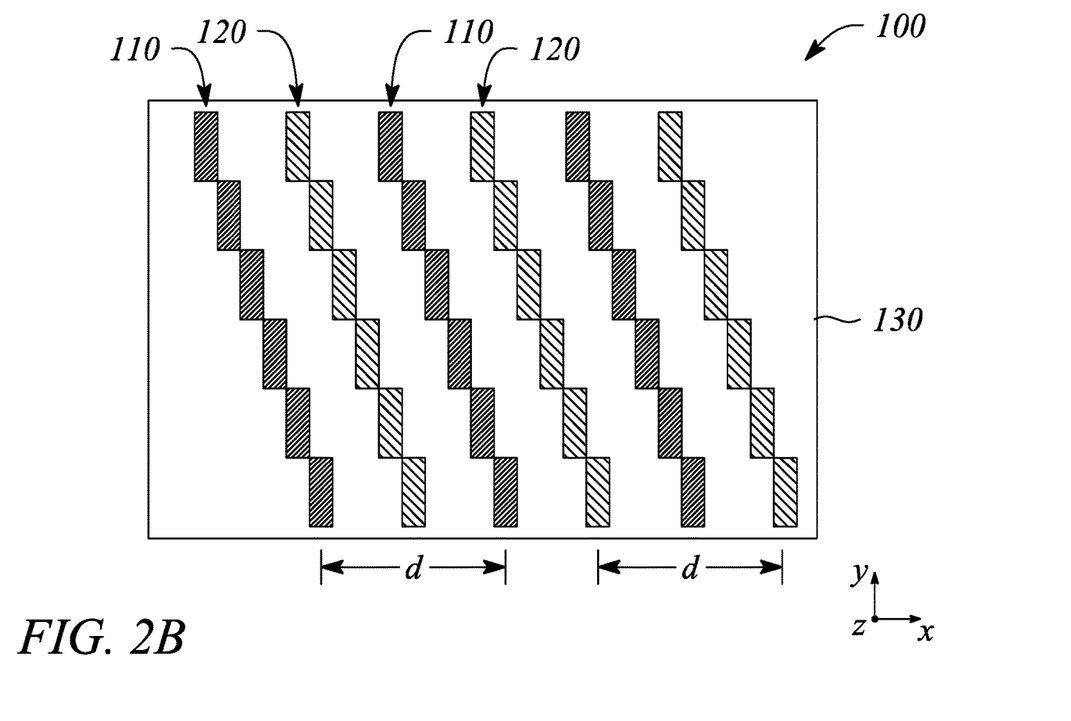
FIG. 2B illustrates a plan view of a multiview backlight in an example, according to an embodiment consistent with the principles described herein.
Figure 2C:
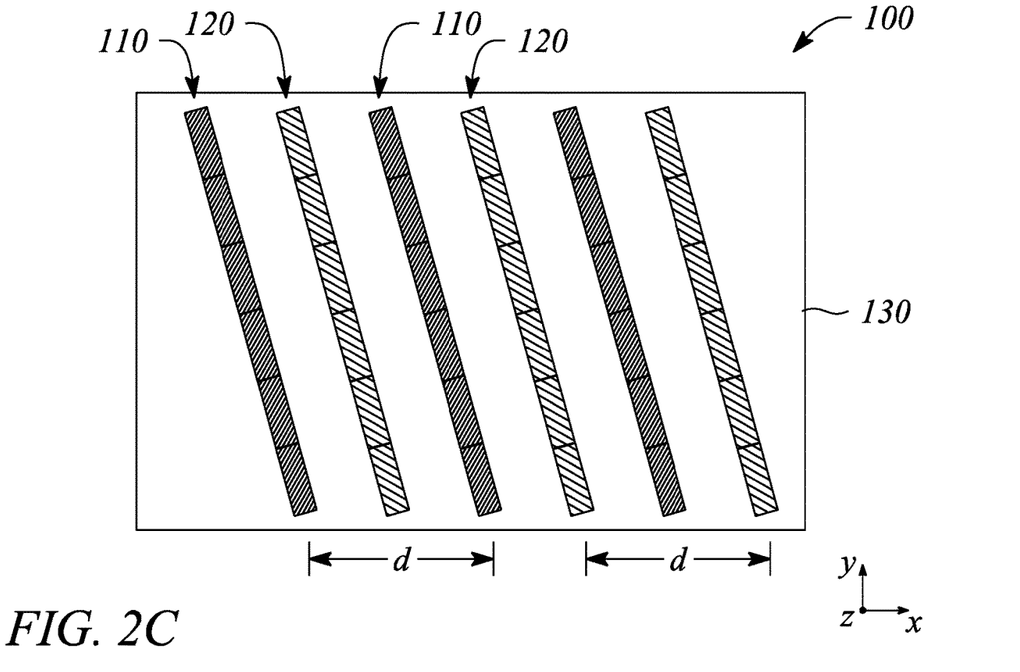
FIG. 2C illustrates a plan view of a multiview backlight in an example, according to another embodiment consistent with the principles described herein.

According to some embodiments of the principles described herein, a multiview backlight is provided. FIG. 2A illustrates a cross-sectional view of a multiview backlight 100 in an example, according to an embodiment consistent with the principles described herein. FIG. 2A also illustrates a multiview display that employs the multiview backlight 100, by way of example and not limitation. FIG. 2B illustrates a plan view of a multiview backlight 100 in an example, according to an embodiment consistent with the principles described herein. FIG. 2C illustrates a plan view of a multiview backlight 100 in an example, according to another embodiment consistent with the principles described herein. The multiview backlight 100 is configured to emit or provide directional light beams 102. According to various embodiments, the directional light beams 102 provided by the multiview backlight 100 have directions corresponding to view directions of the multiview display or equivalently of a multiview image displayed by the multiview display.

The multiview backlight 100 illustrated in FIGS. 2A-2C comprises a first array of active emitters 110. Active emitters 110 of the first active emitter array are arranged as spaced-apart columns, i.e., columns that are spaced-apart from one another. According to various embodiments, each column of the first array of active emitters 110 illustrated in FIGS. 2A-2C is configured to emit or provide light as a first plurality of the directional light beams 102' in a plane that crosses the columns (e.g., the plane may be substantially perpendicular to columns). Further, the first plurality of directional light beams 102' provided by the columns of active emitters 110 of the first active emitter array may have directions corresponding to the view directions of a multiview display or equivalently of a multiview image displayed by the multiview display. Further, the view directions may be in or substantially confined to the plane that crossed the columns. As such, the directional light beams 102 provided by the multiview backlight 100 may comprise the directional light beams 102' of the first directional light beam plurality provided by the columns of the first active emitter array, according to various embodiments. Differently directed, solid-line arrows in FIG. 2A represent directional light beams 102' of the first directional light beam plurality, by way of illustration and not limitation.

As illustrated in FIGS. 2A-2C, the multiview backlight 100 further comprises a second array of active emitters 120. Active emitters 120 of the second active emitter array are also arranged as spaced-apart columns, according to various embodiments. Further, columns of the second active emitter array are disposed between and alternate with the columns of the first active emitter array, as illustrated in FIG. 2A-2C. That is, the columns of active emitters 120 of the second active emitter array are interleaved with or in between the columns of active emitters 110 of the first active emitter array, according to various embodiments. In some embodiments, columns of active emitters 120 of the second active emitter array may be interleaved or disposed about halfway between adjacent columns of active emitters 110 of the first active emitter array.

According to various embodiments, each column of the second array of active emitters 120 is configured to emit or provide light as a second plurality of directional light beams 102" in a plane that crosses the columns (e.g., the plane may be substantially perpendicular to the columns). As with the first plurality of directional light beams 102', the directional light beams 102" of the second plurality of directional light beams 102" may have directions corresponding to view directions of a multiview display or equivalently of a multiview image displayed by the multiview display. In particular, the directions of the directional light beams 102" of the second directional light beam plurality may be equivalent to or have the same as the directions of the directional light beams 102' of the first directional light beam plurality, according to some embodiments. Therefore, the directional light beams 102 provided by the multiview backlight 100 may further comprise the directional light beams 102" of the second directional light beam plurality provided by the columns of active emitters 120 of the second active emitter array. In FIG. 2A, differently directed, dashed-line arrows represent the directional light beams 102" of the second directional light beam plurality, by way of illustration and not limitation. The dashed arrows also distinguish the directional light beams 102" from the directional light beams 102' of the first directional light beam plurality, as illustrated.

In some embodiments, a distance between adjacent columns of one or both of the first array of active emitters 110 and the second array of active emitters 120 is corresponds to (i.e., is comparable to or commensurate with) a distance between multiview pixels of the multiview display that employs the multiview backlight 100. In particular, a distance (e.g., center-to-center distance) between adjacent columns of the first active emitter array may be about equal to a center-to-center distance between adjacent multiview pixels. Similarly, a center-to-center distance between adjacent columns of the second active emitter array may be about equal to a center-to-center distance between adjacent multiview pixels. As a result, there may be a one-to-one or unique correspondence between a multiview pixel and an individual column of active emitters 110, 120, according to some embodiments. Further, as illustrated in FIG. 2A, the view directions of the multiview display are in a plane that crosses the columns of first and second active emitter arrays.

According to various embodiments, a width of a column of the active emitters 110, 120 of the first and second active emitter arrays is comparable to a size of a light valve in a light valve array of a multiview display that employs the multiview backlight 100. In particular, the width of an active emitter column of each of the first active emitter array and the second active emitter array may be between about one quarter (0.25) and about two (2.0) times the light valve size. For example, the column width may be about equal to the light valve size. In another example, the width may be between about one half (0.5) or fifty percent (50%) and about two (2.0) times or two hundred percent (200%) of the light valve size. In other examples, the column width is greater than about sixty percent (60%) of the light valve size, or greater than about seventy percent (70%) of the light valve size, or greater than about eighty percent (80%) of the light valve size, or greater than about ninety percent (90%) of the light valve size. Further, in some examples the column width is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size.

In some embodiments, the width of a column of the active emitters 110, 120 may be defined as a size of a portion of the active emitter 110, 120 within the column that actively emits light when the active emitter 110, 120 is activated (e.g., the active portion of the active emitter). The size of the light valve may be defined as an aperture size of the light valve or equivalently defined by a center-to-center distance between light valves of the light valve array, for example. According to some embodiments, the comparable widths of the columns of active emitters 110, 120 and the light valves may be chosen to reduce, or in some examples to minimize, dark zones between views of the multiview display (e.g., to minimize Moiré), while at the same time reducing, or in some examples minimizing, an overlap between views of the multiview display.

By way of example and not limitation, FIG. 2A further illustrates an array of light valves 104, for the purpose of facilitating discussion herein. The illustrated light valve array may be part of the multiview display that employs the multiview backlight 100, for example. Light valves 104 of the light valve array illustrated in FIG. 2A are configured to modulate the directional light beams 102 (e.g., the directional light beams 102', 102"), to provide a multiview image that is displayed by the multiview display. Further, different ones of the directional light beams 102 having different principal angular directions pass through and may be modulated by different ones of the light valves 104 in the light valve array, as illustrated.

By definition herein, a light valve 104 of the light valve array may correspond to a view pixel of the multiview display, while a set of the light valves 104 or set of view pixels may correspond to a multiview pixel 106. In particular, a different set of light valves 104 of the light valve array may be configured to receive and modulate the directional light beams 102, 102', 102" from different ones of the columns of active emitters 110, 120. As such, there may be one unique set of light valves 104 (or multiview pixel 106) for each active emitter column, e.g., as illustrated in FIG. 2A with respect to the columns of active emitters 110, 120. In various embodiments, different types of light valves may be employed as the light valves 104 of the light valve array including, but not limited to, one or more of liquid crystal light valves, electrophoretic light valves, and light valves based on electrowetting.

Further, FIG. 2A illustrates a size S of a light valve 104 that corresponds to an aperture size of the light valve 104 in the light valve array, as illustrated. In other examples, the light valve size may be defined as a distance (e.g., a center-to-center distance) between adjacent light valves 104 of the light valve array. For example, an aperture of the light valves 104 may be smaller than the center-to-center distance between the light valves 104 in the light valve array. Thus, as mentioned above, the light valve size may be defined as either the size of the light valve 104 or a size corresponding to the center-to-center distance between the light valves 104, among other definitions. Also, in FIG. 2A, a size s of the columns of active emitters 110, 120 is illustrated as comparable to the light valve size S.

Further as illustrated in FIG. 2A, an inter-column distance (e.g., center-to-center distance) between a pair of adjacent columns of active emitters 110, 120 is about equal to an inter-pixel distance (e.g., a center-to-center distance) between a corresponding pair of adjacent multiview pixels 106, e.g., represented by light valve sets. For example, a center-to-center distance d between a column of active emitters 110a of the first active emitter array and another column of active emitters 110b of the first active emitter array is substantially equal to a center-to-center distance D between a first light valve set 104a and the second light valve set 104b, where each light valve set 104a, 104b represents a multiview pixel 106. In other embodiments (not illustrated), the relative center-to-center distances of pairs of columns of active emitters 110a, 110b (or columns of active emitters 120) and corresponding light valve sets 104a, 104b may differ, e.g., the columns of active emitters 110, 120 may have an inter-element spacing (i.e., center-to-center distance d) that is one of greater than or less than a spacing (i.e., center-to-center distance D) between light valve sets representing multiview pixels 106.

In some embodiments, the columns of the first and second active emitter arrays may be slanted. For example, the columns may have a slant relative to an edge of a substrate that supports the first and second active emitter arrays. Equivalently, the columns may be slanted relative to columns of light valves of the light valve array. FIGS. 2B and 2C illustrate the columns of the first and second arrays of active emitters 110, 120 as slanted columns. Further, the multiview image provided by a multiview display that employs the multiview backlight 100 may be a so-called 'horizontal-parallax-only' (HPO) multiview image having a plurality of views in only one direction, i.e., in a direction substantially perpendicular to or across the columns.

According to some embodiments, an active emitter 110, 120 of one or both of the first active emitter array and the second active emitter array may comprise either a mini light emitting diode (miniLED or mLED) or a micro light emitting diode (microLED or μLED). Herein, a miniLED is a light emitting diode having dimensions that are less than about 0.5 millimeters (mm). For example, a miniLED may have dimensions in the range of about 75 micrometers (μm) to about 300 μm. Herein, μLED is defined as a microscopic light emitting diode (LED), i.e., an LED having microscopic dimensions that are less than 100 μm and more generally less than about 75 μm. For example, a microLED may have a size of about 10-50 μm. In some embodiments, the miniLED or μLED may comprise a plurality of miniLEDs or μLEDs that, when combined, function together as a unit as the active emitter 110, 120 and have a size that is comparable to the light valve size.

In some embodiments, the miniLED or μLED may comprise a plurality of different regions (or equivalently the plurality of miniLEDs or μLEDs), each of the different regions being configured to provide a different color of light. For example, the miniLED or μLED may comprise three regions, a first region being configured to provide red light, a second region being configured to provide green light, and a third region being configured to provide blue light. As such, the miniLED or μLED may be configured to selectably provide red, green, or blue light or any combination thereof (e.g., white light).

According to some embodiments, an active emitter 110, 120 of one or both of the first active emitter array and the second active emitter array may comprise an organic light emitting diode (OLED). As defined herein, an OLED is an emitter having an emissive electroluminescent film or layer comprising an organic compound configured to emit light in response to an electric current or similar electrical stimulus. As with the miniLED and μLED, the OLED may comprise a plurality of OLEDs that, when combined, function together as a unit as the active emitter 110, 120. In some embodiments, the OLED may comprise a plurality of different regions, each of the different regions being configured to provide a different color of light. For example, the OLED may comprise three regions, a first region being configured to provide red light, a second region being configured to provide green light, and a third region being configured to provide blue light. As such, the OLED serving as the active emitter 110, 120 may be configured to selectably provide red, green, or blue light or any combination thereof (e.g., white light). In yet other embodiments, another type of active optical emitter may be used as the active emitter 110, 120 such as, but not limited to, a high intensity LED and a quantum dot LED having a size comparable to the light valve size.

According to some embodiments, the active emitters 110, 120 of the columns of the first and second active emitter arrays may be arranged vertically or substantially vertically, as illustrated in FIG. 2B. In other embodiments, active emitters 110, 120 may be rotated to be in line with the columns, as illustrated in FIG. 2C.

In some embodiments a directional diffuser may be used to spread light emitted by the active emitters 110, 120 in a direction that is one or both of along the columns and perpendicular to the plane that includes the view directions. For example, the diffuser may spread the light along the columns to an extent that the columns of active emitters 110, 120 appear to be substantially continuous columns of active emitters 110, 120. Spreading the light along the columns may facilitate a reduction in a number of active emitters 110, 120 that are needed along a length of the columns.

In some embodiments, the active emitter 110, 120 may be configured to provide light that is substantially monochromatic having a particular color (i.e., the light may include a particular wavelength of light). In other embodiments, the active emitters 110, 120 may be configured to provide polychromatic light such as, but not limited to, white light, that includes a plurality or range of wavelengths. For example, the active emitters 110, 120 may be configured to provide one or more of red light, green light, blue light, or a combination thereof. In another example, the active emitters 110, 120 may be configured to provide light that is substantially white light (i.e., the active emitter 110, 120 may be a white μLED or white OLED). In some embodiments, the active emitter 110, 120 may include a micro-lens, a diffraction grating, or another optical film or component configured to provide one or both of collimation (e.g., according to a collimation factor) and polarization control of emitted light or equivalent of the directional light beams 102, 102', 102". The micro-lens, the diffraction grating, or the other optical film or component may also or alternatively be configured to control a direction of the directional light beams 102, 102', 102". Alternatively, one or both of the collimation and polarization control may be provided by an optical layer or film between the active emitter arrays and the light valve array, for example.

Active emitters 110, 120 within columns of the first and second active emitter arrays may be independently controlled, activated, or powered to provide local dimming and also to enable switching between directional light beam production by the first and second active emitter arrays, according to some embodiments. In particular, in some embodiments, the columns of active emitters 110 of the first active emitter array may be configured to provide by selective activation the first plurality of directional light beams 102', e.g., during a first time interval or a particular mode. Similarly, the columns of active emitters 120 of the second active emitter array may be configured to provide the second plurality of directional light beams 102" by selective activation, e.g., during a second time interval or a particular mode. In various embodiments, the first time interval and the second time interval may be alternating, sequential time intervals, as described further below. Activation may be provided by a controller that provides power to the active emitters 110, 120, for example.

Figure 3A:
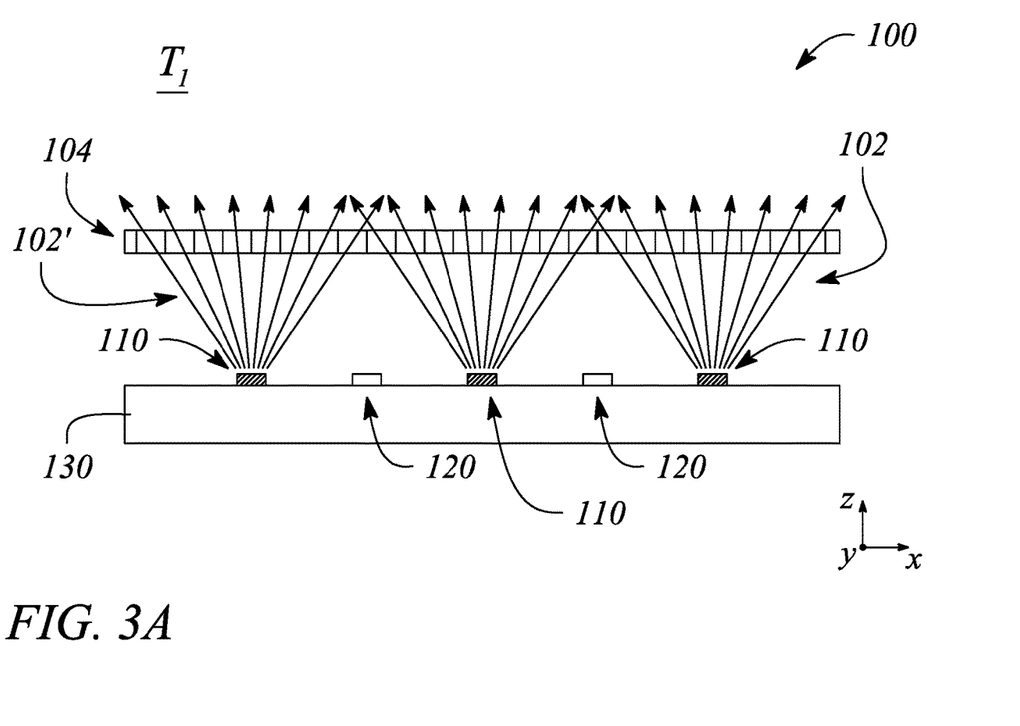
FIG. 3A illustrates a cross-sectional view of a multiview backlight in an example, according to an embodiment of the principles described herein.
Figure 3B:
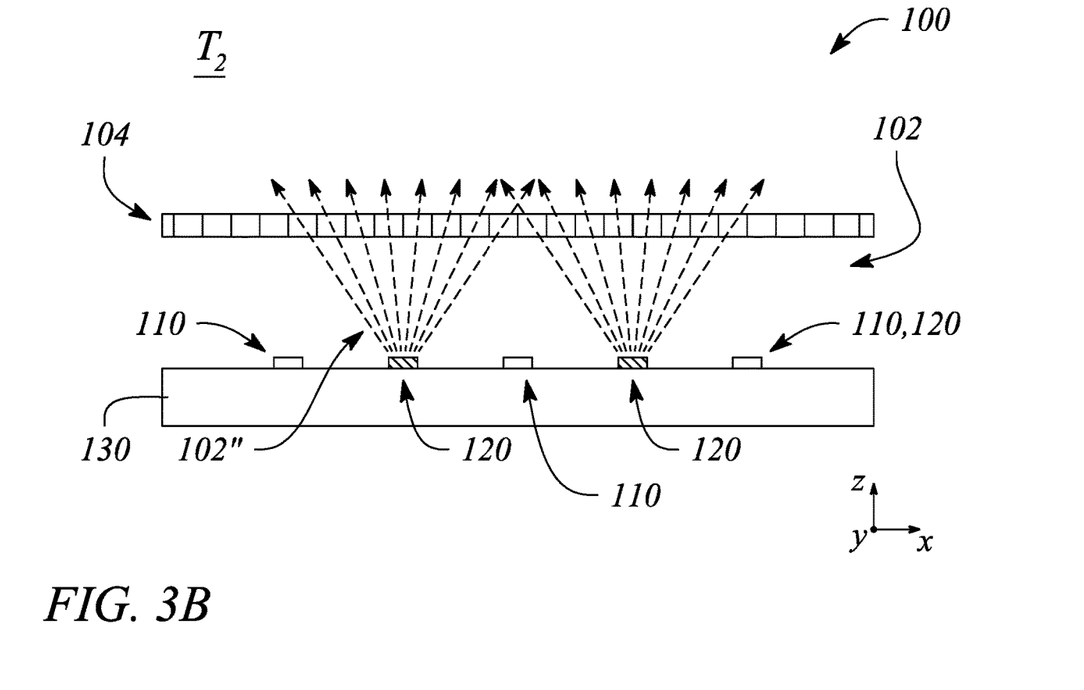
FIG. 3B a cross-sectional view of the multiview backlight of FIG. 3A in an example, according to an embodiment of the principles described herein.

FIG. 3A illustrates a cross-sectional view of a multiview backlight 100 in an example, according to an embodiment of the principles described herein. FIG. 3B illustrates a cross-sectional view of the multiview backlight 100 of FIG. 3A in an example, according to an embodiment of the principles described herein. The multiview backlight 100 illustrated in FIGS. 3A-3B comprises columns of the first array of active emitters 110 and columns of the second array of active emitters 120. The array of light valves 104 is also illustrated in FIGS. 3A-3B.

As illustrated, the multiview backlight 100 is configured to provide selective activation of the columns of the first and second active emitter arrays during different time intervals. In particular, FIG. 3A illustrates the multiview backlight 100 during a first time interval $T_1$ and FIG. 3B illustrates the multiview backlight 100 during a second time interval $T_2$.

During the first time interval $T_1$ (FIG. 3A), the columns of the first array of active emitters 110 are selectively activated to provide the first plurality of directional light beams 102', while the columns of the second array of active emitters 120 are selectively activated to provide the second plurality of directional light beams 102" during the second time interval $T_2$. The first time interval $T_1$ and the second time interval $T_2$ may alternate in a time-sequential manner, for example. As such, the array of light valve 104 may be time multiplexed such that directional light beams 102' provided by the first array of active emitters 110 are modulated during the first time interval $T_1$ and directional light beams 102" provided by the second array of active emitters 120 are modulated during the second time interval $T_2$, according to some embodiments. Time multiplexing of the light valve array may be provided by a display driver that is coordinated with the active emitter controller, for example.

Time multiplexing of the array of light valves 104 may provide an effective doubling of a resolution of a multiview image displayed by a multiview display that includes the multiview backlight 100 and array of light valves 104, as illustrated in FIGS. 3A-3B when compared to the same multiview display in which time multiplexing is not employed, for example. Moreover, the multiview image resolution may be selectively increased or decreased by either using or not using time multiplexing, according to various embodiments. Note that, as illustrated in FIGS. 3A-3B, the displayed multiview image may include four different views by way of example and not limitation.

In other embodiments, the first array of active emitters 110 may be configured to provide the first plurality of directional light beams 102' during a first mode of the multiview backlight 100. In particular, the columns of the first array of active emitters 110 may be activated during the first mode. The columns of the second array of active emitters 120 may be inactivated during the first mode, for example. Further, during a second mode, both the columns of the first array of active emitters 110 may be configured to provide the first plurality of directional light beams 102' and the columns of the second array of active emitters 120 may be configured to provide the second plurality of directional light beams 102" during a second mode of the multiview backlight 100. In particular, columns of both the first and second active emitter arrays may be activated during the second mode.

Figure 4A:
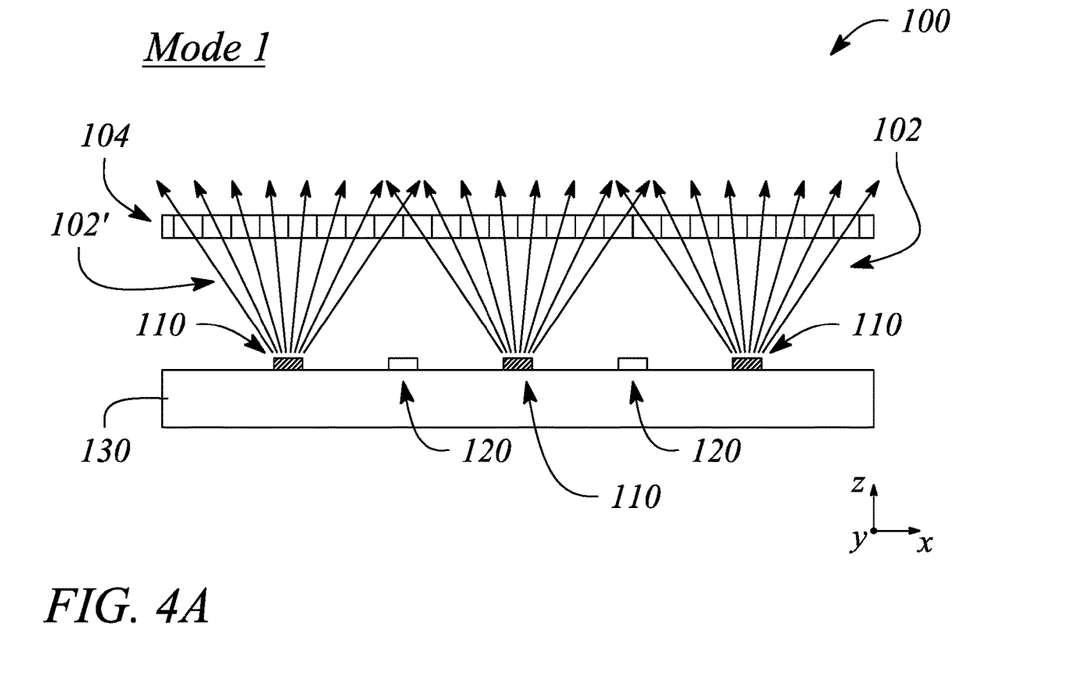
FIG. 4A illustrates a cross-sectional view of a multiview backlight in an example, according to an embodiment of the principles described herein.
Figure 4B:
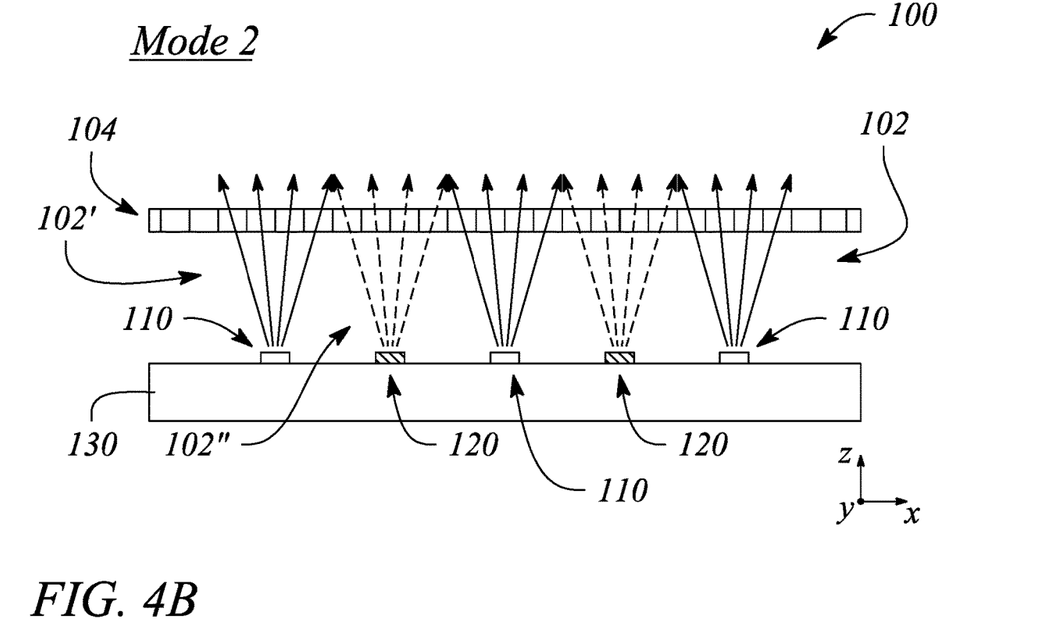
FIG. 4B a cross-sectional view of the multiview backlight of FIG. 4A in an example, according to an embodiment of the principles described herein.

FIG. 4A illustrates a cross-sectional view of a multiview backlight 100 in an example, according to an embodiment of the principles described herein. FIG. 4B a cross-sectional view of the multiview backlight 100 of FIG. 4A in an example, according to an embodiment of the principles described herein. The multiview backlight 100 illustrated in FIGS. 4A-4B comprises the first array of active emitters 110 and the second array of active emitters 120, active emitters 110, 120 of each of which are arranged in columns. The array of light valves 104 is also illustrated in FIGS. 4A-4B. Further, the multiview backlight 100 is illustrated during or in a first mode (Mode 1) in FIG. 4A, while the multiview backlight 100 is illustrated in FIG. 4B during or in a second mode (Mode 2).

In particular, FIG. 4A illustrates the multiview backlight 100 during the first mode (Mode 1) in which columns of active emitters 110 of the first active emitter array are activated and columns of active emitters 120 of the second active emitter array are inactivated. As illustrated, the active emitters 110 provide the directional light beams 102' of the first directional light beam plurality when activated during the first mode (Mode 1). These directional light beams 102' may be modulated by the array of light valves 104 to provide a multiview image having a first quantity or number of different views characterized by a multiview pixel 106. In particular, the multiview pixel 106 associated with an active emitter 110 during the first mode includes view pixels (or light valves) corresponding to eight (8) different views, as illustrated in FIG. 4A by way of example and not limitation.

FIG. 4B illustrates the multiview backlight 100 during the second mode (Mode 2) in which both the columns of active emitters 110 of the first active emitter array and the columns of active emitters 120 of the second active emitter array are activated simultaneously. As illustrated, the columns of active emitters 110, 120 provide directional light beams 102', 102" of both of the first directional light beam plurality and the second directional light beam plurality when activated. In each of the first and second modes, light valves 104 of the light valve array may be used to modulate the directional light beams 102 (e.g., only the directional light beams 102' in the first mode and directional light beams 102', 102" during the second mode) to provide the multiview image. Moreover, a resolution of the multiview image may be increase (e.g., doubled) in the second mode (Mode 2) compared to the resolution in the first mode (Mode 1). Of course, as illustrated in FIGS. 4A-4B, a quantity or number of views of the multiview image provided in the second mode (Mode 2) is less than (e.g., half of) a number of views of the multiview image provided in the first mode (Mode 1). In particular, multiview pixels 106 are associated with each of the active emitters 110, 120 and each of the multiview pixels 106 includes view pixels (or light valves) corresponding to four (4) different views in the second mode (Mode 2), as illustrated in FIG. 4B by way of example and not limitation. Accordingly, switching between the first mode (Mode 1) and the second mode (Mode 2) may facilitate switching between a greater number of views (lower resolution) and a higher resolution (fewer views) of the multiview image.

Referring again to FIG. 2A, the multiview backlight 100 may further comprise a planar substrate 130, in some embodiments. In particular, the columns of active emitters 110, 120 may be spaced apart across a surface of the planar substrate 130. The planar substrate 130 may further comprise electrical interconnects to provide power to the active emitters 110, 120. In some embodiments, the planar substrate 130 is configured to be optically transparent or at least substantially optically transparent (i.e., may be a planar transparent substrate). For example, the planar substrate 130 may comprise an optically transparent material capable of transmitting light from a first side to a second side of the planar substrate 130. Further, electrical interconnects may be optically transparent, in some embodiments. Moreover, a combination of the first and second arrays of active emitters 110, 120 and the planar substrate 130 (e.g., along with the electrical interconnects) may be configured to be optically transparent, in some embodiments.

According to some embodiments, the multiview backlight 100 may further comprise a broad-angle backlight adjacent to the planar substrate 130. The broad-angle backlight may be configured to provide broad-angle emitted light. Further, a combination of the first and second arrays of active emitters 110, 120 and the planar substrate 130 may be configured to be transparent to the broad-angle emitted light, according to various embodiments.

Figure 5:
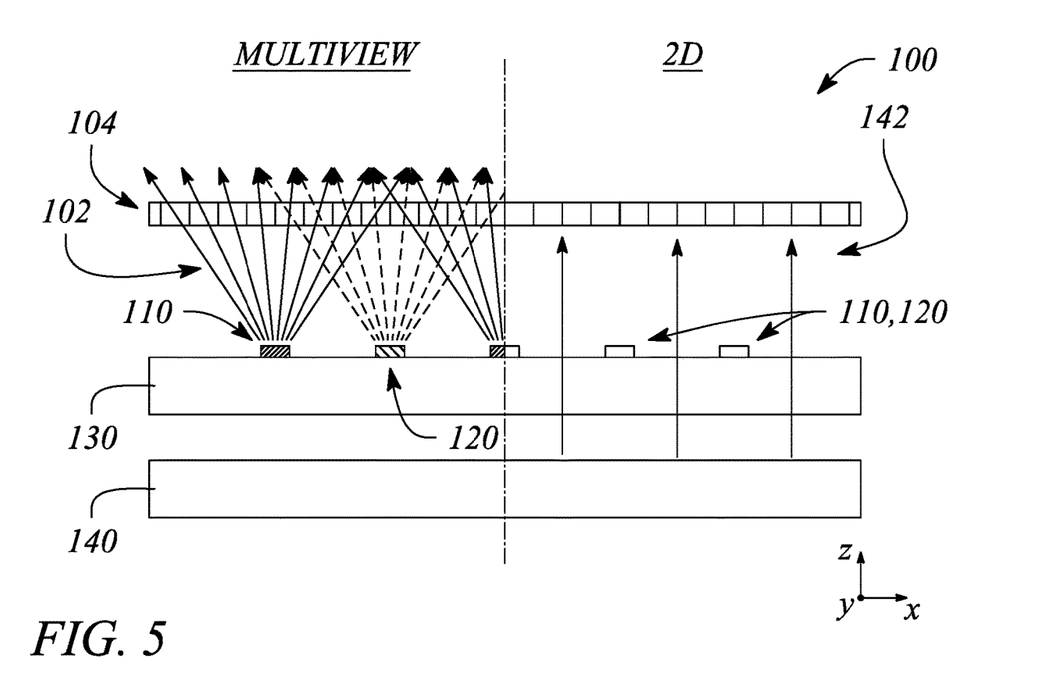
FIG. 5 illustrates a cross-sectional view of a multiview backlight including a broad-angle backlight in an example, according to an embodiment consistent with the principles described herein.

FIG. 5 illustrates a cross-sectional view of a multiview backlight 100 including a broad-angle backlight 140 in an example, according to an embodiment consistent with the principles described herein. In particular, FIG. 5 illustrates the broad-angle backlight 140 adjacent to a surface of the planar substrate 130 with columns of active emitters 110, 120 arranged on an opposite surface. FIG. 5 further illustrates an array of light valves 104 adjacent to the opposite surface of the planar substrate 130.

As illustrated on a left side of FIG. 5, a multiview image (MULTIVIEW) may be provided using the multiview backlight 100 by activating the columns of active emitters 110, 120 to provide directional light beams 102, e.g., one or both of directional light beams 102', 102", as variously described and illustrated above. Alternatively, as illustrated on a right side of FIG. 5, a two-dimensional (2D) image may be provided by inactivating the columns of active emitters 110, 120 and activating the broad-angle backlight 140 to provide broad-angle emitted light 142 to the array of light valves 104. As such, the multiview backlight 100 including the broad-angle backlight 140 and the planar substrate 130 configured to be transparent may be used to implement an electronic display that may be switched between displaying a multiview image and displaying a 2D image, according to various embodiments. Herein, the columns of active emitters 110, 120 are illustrated as being activated by using crosshatching, while active emitters 110, 120 without crosshatching represent an inactivated state or condition.

In another embodiment (not illustrated), additional columns of active emitters may be provided in between the active emitter columns of the first and second active emitter arrays. In some embodiments, the additional columns may be used selectively as a third, fourth and so on, column of active emitters to extend either the multiplexing or mode switching concepts discussed above. In another embodiment, the additional columns may be used or activated in conjunction with the columns of the first and second active emitter arrays to effectively provide broad-angle emitted light, e.g., instead of using a separate broad-angle backlight to display a 2D image.

In accordance with some embodiments of the principles described herein, a multiview display is provided. The multiview display is configured to display a multiview image, according to various embodiments. Further, an image resolution of the multiview image is configured to be dynamically selectable according to an operational mode, according to various embodiments. In some embodiments, image resolution and a number of different views of the multiview image are dynamically selectable.

Figure 6:
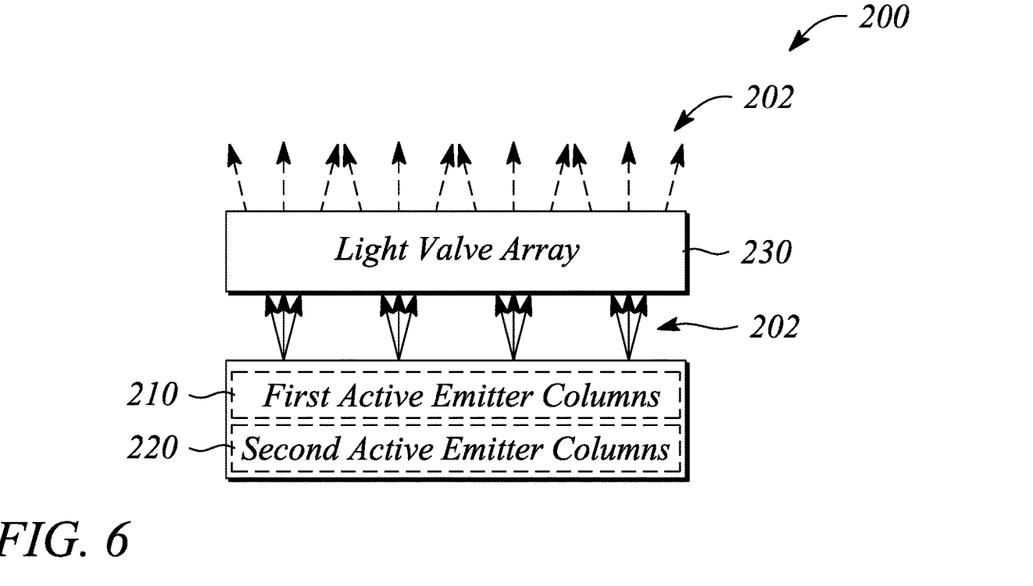
FIG. 6 illustrates a block diagram of a multiview display in an example, according to an embodiment consistent with the principles described herein.

FIG. 6 illustrates a block diagram of a multiview display 200 in an example, according to an embodiment consistent with the principles described herein. As illustrated, the multiview display 200 comprises a first plurality of active emitter columns 210. The first plurality of active emitter columns 210 is configured to provide directional light beams 202 having directions corresponding to view directions of a multiview image provided by the multiview display 200 (or equivalently view directions of the multiview display 200). In particular, each active emitter column 210 of the first plurality of active emitter columns 210 is configured to provide directional light beams 202 having directions of or corresponding to the view directions of the multiview display 200 or equivalently the multiview image displayed by the multiview display 200.

The multiview display 200 illustrated in FIG. 6 further comprises a second plurality of active emitter columns 220, the second plurality of active emitter columns 220 being interleaved with (or disposed between) active emitter columns of the first plurality of active emitter columns 210 on a surface of a substrate. As with the first plurality of active emitter columns 210, the second plurality of active emitter columns 220 is configured to provide directional light beams 202 having directions corresponding to the view directions of the multiview image. In particular, each active emitter column 220 of the second plurality of active emitter columns 220 is configured to provide directional light beams 202 having directions of or corresponding to the view directions of the multiview display 200 or equivalently view directions of views of the multiview image. Furthermore, the directions of the directional light beams 202 provided by the second plurality of active emitter columns 220 may be substantially similar to the directions of the directional light beams 202 provided by the first plurality of active emitter columns 210.

As illustrated in FIG. 6, the multiview display 200 further comprises an array of light valves 230. The array of light valves 230 is configured to modulate the directional light beams 202 provided by one or both of the first plurality of active emitter columns 210 and the second plurality of active emitter columns 220. In some embodiments, the array of light valves 230 may be substantially similar to the array of light valves 104 described above with respect to the multiview backlight 100. In particular, the array of light valves 230 may be configured to modulate the directional light beams 202 to provide the multiview image, according to various embodiments.

In some embodiments, active emitter columns of the first plurality of active emitter columns 210 may be substantially similar to the columns of active emitters 110 of the first active emitter array, described above with respect to the multiview backlight 100. In some embodiments, active emitter columns of the second plurality of active emitter columns 210 may be substantially similar to the columns of active emitters 120 of second active emitter array, also of the above-described multiview backlight 100. In particular, in some embodiments, a width of an active emitter column of the first and second pluralities of active emitter columns 210, 220 is comparable to a size of a light valve 230 of the light valve array. For example, the width may be between about one quarter (0.25) and about two (2.0) times the light valve size.

Further, active emitters of the first and second pluralities of active emitter columns 210, 220 may be substantially similar to the active emitters 110, 120 of the above-described multiview backlight 100. For example, the active emitters may comprise one or both of a micro light emitting diode (µLED) and an organic light emitting diode (OLED), according to various embodiments. Similarly, the substrate upon which the first and second pluralities of active emitter columns 210, 220 are located or disposed may be optically transparent, in some embodiments, as was described above with respect to the planar substrate 130 of the multiview backlight 100.

According to some embodiments, image resolution of the multiview image displayed by multiview display 200 may have a first value in a first operational mode and a second value in a second operational mode. In particular, the first operational mode may comprise active emitter of the first plurality of active emitter columns 210 being activated to provide the directional light beams 202 and active emitters of the second plurality of active emitter columns 220 being inactivated. The first operational mode may be configured to provide the multiview image having a first image resolution, for example.

In some embodiments, the second operational mode may comprise active emitters of both of the first plurality of active emitter columns 210 and the second plurality of active emitter columns 220 being activated to simultaneously provide the directional light beams 202. The second operational mode may be configured to provide the multiview image having a second image resolution, where the second image resolution is greater or higher than the first image resolution, according to some embodiments. For example, the first operational mode may be substantially similar to the first mode (Mode 1) of the multiview backlight 100, while the second operational mode may be substantially similar to the second mode (Mode 2) of the multiview backlight 100, as described above with reference to FIG. 4A and FIG. 4B, respectively. Selecting between the first operational mode and the second operational mode may provide dynamic selection of the image resolution albeit with a concomitant change in a number of views of the multiview image, according to various embodiments (e.g., also as described above).

In other embodiments, the second operational mode may comprise activation of active emitters of the first plurality of active emitter columns 210 to provide the directional light beams 202 during a first time interval and activation of active emitters of the second plurality of active emitter columns 220 to provide the directional light beams 202 during a second time interval. The first and second time intervals may be alternated during sequential time intervals, in some embodiments. For example, the second operational mode may be substantially similar to the time-multiplexing described above with respect to the multiview backlight 100 with reference to FIGS. 3A and 3B. As above, selecting between the first operational mode and the second operational mode may provide dynamic selection of the image resolution (e.g., with and without using time-multiplexing), according to various embodiments.

In some embodiments (not illustrated), the multiview display 200 may further comprise a broad-angle backlight configured to provide broad-angle emitted light. According to various embodiments, the broad-angle backlight may be located adjacent to another surface of the substrate opposite to the surface on which the first and second pluralities of active emitter columns 210, 220 are disposed. In some embodiments, the broad-angle backlight may be substantially similar to the broad-angle backlight 140 of the multiview backlight 100, illustrated and described with respect to FIG. 5. In particular, a combination of the first and second pluralities of active emitter columns 210, 220 and the substrate may be substantially transparent to the broad-angle emitted light, according to some embodiments.

Figure 7:
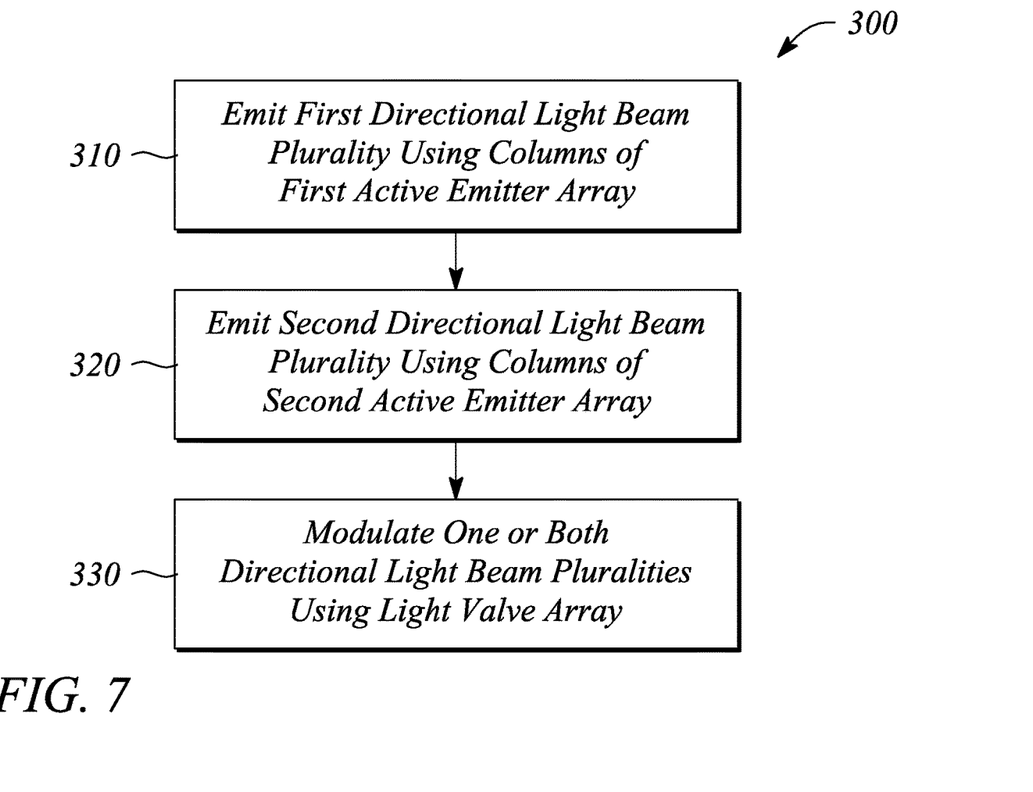
FIG. 7 illustrates a flow chart of a method of multiview backlight operation in an example, according to an embodiment of the principles described herein.

In accordance with some embodiments of the principles described herein, a method of multiview backlight operation is provided. FIG. 7 illustrates a flow chart of a method 300 of multiview backlight operation in an example, according to an embodiment of the principles described herein. The method 300 of multiview backlight operation illustrated in FIG. 7 comprises emitting 310 a first plurality of directional light beams using a first array of active emitters arranged in columns. In particular, directional light beams of the first plurality of directional light beams have directions corresponding to view directions of a multiview image, according to various embodiments. In some embodiments, the first array of active emitters may be substantially similar to the first array of active emitters 110, described above with respect to the multiview backlight 100.

The method 300 illustrated in FIG. 7 further comprises emitting 320 a second plurality of directional light beams using a second array of active emitters arranged in columns that are interleaved with or disposed between columns of active emitters of the first active emitter array. In particular, directional light beams of the second plurality of directional light beams are emitted having directions corresponding to the view directions of the multiview image. In some embodiments, the second array of active emitters may be substantially similar to the second array of active emitters 120 of the above-described multiview backlight 100. For example, the columns of the first and second active emitter arrays may be slanted, as illustrated FIGS. 2A-2C, described above.

According to various embodiments, the view directions of the multiview image or directions of the directional light beams emitted by the first and second arrays of active emitters are in a plane that crosses the columns of first and second active emitter arrays. Additionally, a column of active emitters of one or both of the first and second active emitter arrays may have a width that is comparable to a size of a view pixel or equivalently a light valve of a multiview display used to display the multiview image. For example, the view pixel may correspond to a light valve of the light valve array used to modulate the directional light beams and the column of active emitters may have a width across the column corresponding to one or both of a size or a distance between light valves of the light valve array. As was described above, the comparable width of the columns of the first and second active emitter arrays may be between about one quarter (0.25) and about two (2.0) times the view pixel or light valve size. In another example, the column width may be between about one half (0.5) and about two (2.0) times the light valve size.

In some embodiments, as illustrated in FIG. 7, the method 300 of multiview backlight operation further comprises modulating 330 one or both of the first plurality of directional light beams and the second plurality of light beams using an array of light valves to display the multiview image. In some embodiments, the array of light valves may be substantially similar to the array of light valves 104, 230, described above with respect to either the multiview backlight 100 or the multiview display 200. In some embodiments, a set of light valves of the array of light valves may correspond to a multiview pixel of a multiview display, while an individual light valve may correspond to an individual view pixel.

In some embodiments, emitting 310 the first plurality of light beams may be performed during a first time interval and emitting 320 the second plurality of light beams is performed during a second time interval, the first and second time intervals alternating in a time sequential manner. These embodiments may be used in conjunction with time-multiplexing (e.g., of the array of light valves), as described above in conjunction with the multiview backlight 100, with reference to FIGS. 3A-3B.

In other embodiments, emitting 310 the first plurality of directional light beams may be performed during a first operational mode. Further, both emitting 310 the first plurality of directional light beams and emitting 320 the second plurality of light beams may be performed during a second operational mode. These embodiments may be used to provide selection between a first image resolution and a second image resolution of the multiview image, as described above in conjunction with the multiview backlight 100, with reference to FIGS. 4A-4B.

Thus, there have been described examples and embodiments of a multiview backlight, a multiview display, and a method of operating a multiview backlight that employ a plurality of arrays of active emitters arranged in columns. It should be understood that the above-described examples are merely illustrative of some of the many specific examples that represent the principles described herein. Clearly, those skilled in the art can readily devise numerous other arrangements without departing from the scope as defined by the following claims.

The invention claimed is:

1. A multiview backlight comprising:
a first array of active emitters arranged as spaced-apart columns, each column of the first active emitter array being configured to provide a first plurality of directional light beams during a first time interval, the first plurality of directional light beams having directions corresponding to view directions of a multiview display; and
a second array of active emitters arranged as spaced-apart columns disposed between and alternating with the columns of the first active emitter array, each column of the second active emitter array being configured to provide a second plurality of directional light beams during a second time interval, the first and second time intervals being alternating sequential time intervals, the second plurality of directional light beams having directions corresponding to the view directions of the multiview display,
wherein the view directions of the multi view display are in a plane that crosses the columns of first and second active emitter arrays,
wherein the columns of the first and second active emitter arrays are slanted, and wherein a width of the columns of the first and second active emitter arrays is between one quarter and two times a size of a light valve of the multiview display.

2. The multiview backlight of claim 1, wherein a distance between adjacent columns of one or both of the first active emitter array and the second active emitter array corresponds to a distance between multiview pixels of the multiview display.

3. The multiview backlight of claim 1, wherein columns of the second active emitter array are disposed about halfway between adjacent columns of the first active emitter array.

4. The multiview backlight of claim 1, wherein an active emitter of one or both of the first active emitter array and the second active emitter array comprises a micro light emitting diode (µLED).

5. The multi view backlight of claim 1, further comprising a planar substrate configured to be optically transparent, columns of the first and second active emitter arrays being spaced apart across a surface of the planar substrate.

6. The multiview backlight of claim 5, further comprising a broad-angle backlight adjacent to the planar substrate, broad-angle backlight being configured to provide broad-angle emitted light, wherein a combination of the columns of the first and second active emitter array and the planar substrate is configured to be transparent to the broad-angle emitted light.

7. A display comprising the multiview backlight of claim 1, the display further comprising an array of light valves configured to modulate directional light beams of one or both of the first plurality of directional light beams and the second plurality of directional light beams to provide a multiview image, a multiview pixel corresponding to a set of light valves of the array of light valves and the display being the multi view display.

8. A multiview display comprising:
a first plurality of active emitter columns configured to provide first directional light beams during a first mode of the multiview backlight and during a second mode of the multiview backlight, the first directional light beams having directions corresponding to view directions of a multi view image;
a second plurality of active emitter columns interleaved with active emitter columns of the first plurality of active emitter columns on a surface of a substrate and configured to provide second directional light beams during a second mode of the multiview backlight but not during the first mode of the multiview backlight, the second directional light beams having directions corresponding to the view directions of the multi view image; and
an array of light valves configured to modulate the directional light beams provided by one or both of the first and second active emitter column pluralities to display the multiview image,
the first and second pluralities of active emitter columns causing the multiview backlight to have a first resolution in the first mode and a second resolution, different from the first resolution, in the second mode,
wherein one or both of a width of the active emitter columns of the first and second pluralities of active emitter columns is between one quarter and two times of a size of a light valve of the array of light valves, and
wherein the first plurality of active emitter columns and the second plurality of active emitter columns are slanted.

9. The multiview display of claim 8, wherein active emitters of the first and second pluralities of active emitter columns comprise one or both of a micro light emitting diode and an organic light emitting diode.

10. The multiview display of claim 8, further comprising a broad-angle backlight configured to provide broad-angle emitted light, the broad-angle backlight being adjacent to another surface of substrate opposite to the surface on which the first and second plurality of columns of active emitters are interleaved, wherein a combination of the first and second plurality of columns of active emitters and the substrate is configured to be transparent to the broad-angle emitted light.

11. A method of multi view backlight operation, the method comprising:
emitting a first plurality of directional light beams during a first time interval using a first array of active emitters arranged in columns, directional light beams of the first plurality of directional light beams having directions corresponding to view directions of a multiview image; and
emitting a second plurality of directional light beams during a second time interval using a second array of active emitters arranged in columns that are interleaved with the columns of the first active emitter array, the first and second time intervals alternating in a time sequential manner, directional light beams of the second plurality of directional light beams having directions corresponding to the view directions of the multi view image,
wherein the view directions are in a plane that crosses the columns of first and second active emitter arrays,
wherein the columns of the first and second active emitter arrays are slanted, and
wherein a width of the columns of the first and second active emitter arrays is between one quarter and two times a size of a light valve of a multiview display that uses the multi view backlight to display the multiview image.

12. The method of multiview backlight operation of claim 11, further comprising modulating one or both of the first plurality of directional light beams and the second plurality of light beams using an array of light valves of a multi view display that uses the multiview backlight to display the multiview image.

\* \* \* \* \*